United States Patent [19]

Hilgert et al.

[11] Patent Number: 5,544,543

[45] Date of Patent: Aug. 13, 1996

[54] DEVICE FOR ADJUSTING THE LENGTH OF FLEXIBLE, MECHANICAL REMOTE-CONTROLS WITH TWO MUTUALLY ADJUSTABLE COMPONENTS THAT CAN BE LOCKED IN DIFFERENT POSITIONS RELATIVE TO EACH OTHER

[75] Inventors: Gunter Hilgert, Wetzlar-Naunheim; Thomas Medebach, Wetzlar-Dudenhofer, both of Germany

[73] Assignee: Kuster & Co., GmbH, Ehringshausen, Germany

[21] Appl. No.: 175,367

[22] PCT Filed: May 5, 1993

[86] PCT No.: PCT/EP93/01102

§ 371 Date: Jan. 7, 1994

§ 102(e) Date: Jan. 7, 1994

[87] PCT Pub. No.: WO93/22571

PCT Pub. Date: Nov. 11, 1993

[30] Foreign Application Priority Data

May 7, 1992 [DE] Germany .................... 42 14 533.3

[51] Int. Cl.⁶ .................................................. F16C 1/22
[52] U.S. Cl. ..................................... 74/502.4; 74/501.5 R
[58] Field of Search .................... 74/501.5 R, 502.4; 188/196 B; 192/111 A

[56] References Cited

U.S. PATENT DOCUMENTS

| 4,304,322 | 12/1981 | Beccaris | 192/111 A |
| 4,378,713 | 4/1983 | Haskell et al. | 192/111 A X |
| 4,464,950 | 8/1984 | Deligny | 74/501.5 R |
| 4,690,262 | 9/1987 | Hoyle | 192/111 A |
| 4,693,137 | 9/1987 | Deligny | 74/501.5 R |
| 4,751,851 | 6/1988 | Deligny et al. | 74/501.5 R |
| 4,793,206 | 12/1988 | Suzuki | 74/501.5 R |
| 4,887,705 | 12/1989 | Solano et al. | 192/111 A |
| 4,892,004 | 1/1990 | Segura et al. | 74/501.5 R |
| 5,156,063 | 10/1992 | Kelley | 74/501.5 R |

FOREIGN PATENT DOCUMENTS

| 2059286 | 10/1991 | Canada . | |
| 0342143 | 11/1989 | European Pat. Off. . | |
| 2176861 | 1/1987 | United Kingdom | 192/111 A |

Primary Examiner—Rodney H. Bonck
Assistant Examiner—Mary Ann Battista
Attorney, Agent, or Firm—Longacre & White

[57] ABSTRACT

A length compensation device for Bowden controls, mechanical flexible remote controls or the like with two components adjustable with respect to each other and interlockable in different positions. The mutually interlocked components are retained in the interlocked position by a movable retaining element. The device may be designed so that it automatically carries out a length compensation once the retaining element has been manually moved and unlocked, or the length compensation is automatically carried out.

10 Claims, 2 Drawing Sheets

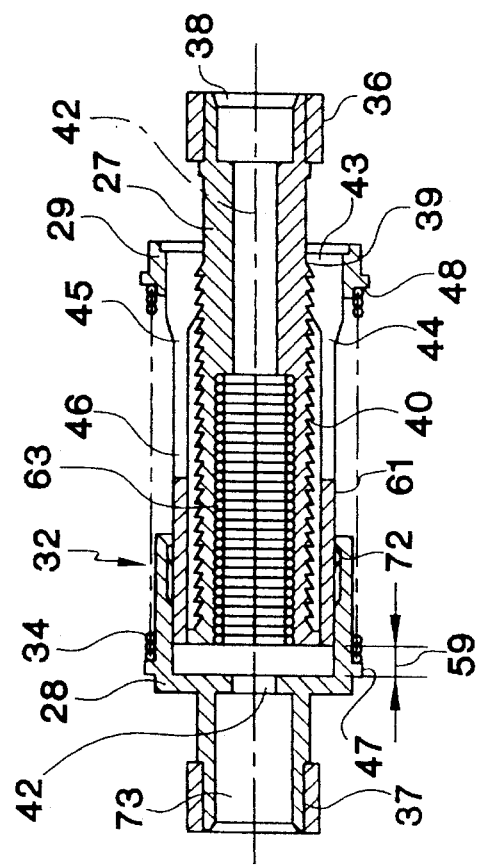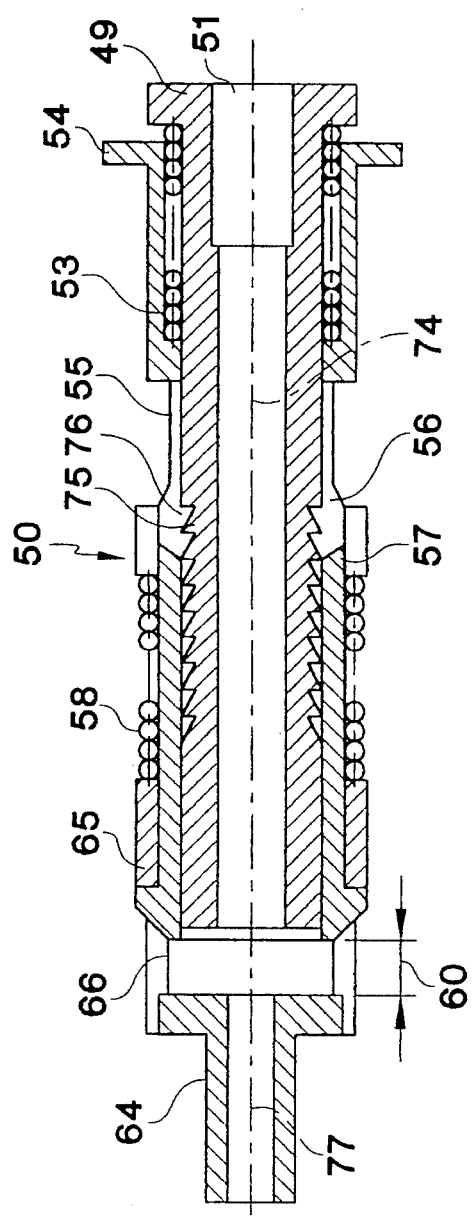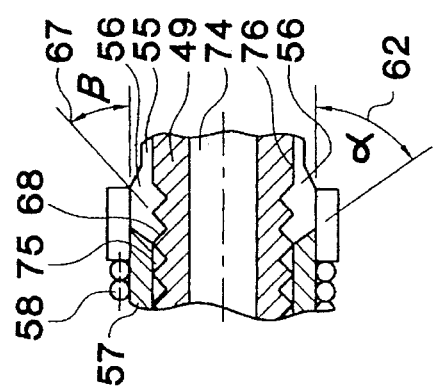

DEVICE FOR ADJUSTING THE LENGTH OF FLEXIBLE, MECHANICAL REMOTE-CONTROLS WITH TWO MUTUALLY ADJUSTABLE COMPONENTS THAT CAN BE LOCKED IN DIFFERENT POSITIONS RELATIVE TO EACH OTHER

BACKGROUND OF THE INVENTION a) Field of the Invention

The invention concerns a device to adjust the length of cables, of flexible, mechanical remote-controls and the like comprising two mutually adjustable components that can be locked into or snapped into different positions relative to each other.

b) Description of the Related Art

Frequently motor-vehicle cables for couplings or clutches are not made by the automobile manufacturer but instead are supplied by the accessories industry. They must be pre-set in such manner that a minimum of costs shall be entailed during assembly at the plant of the motor-vehicle manufacturer. The cables, which consist of a wire rope and a sheath surrounding it, are fitted for such a purpose with a length-adjusting device which as a rule will change the sheath length. As a rule the cables are supplied to the motor-vehicle manufacture with their sheath length set at a minimum so that the cable ends can be easily hooked into the clutch pedal and the disengaging lever. If the sheath length is initially excessive and if the cable wire can be hooked up only by pre-displacement of the disengaging lever, the clutch might no longer engage. Moreover pre-displacing the disengaging lever is work making tool use practically mandatory. Accordingly a cable sheath less than nominal length must be supplied to the automotive manufacturer. This length deficiency is compensated during assembly in a first adjustment by the length-adjusting device of the initially cited kind, whereby the length of wire rope and of sheath of the cable will precisely match in the assembled state.

The German patent 671,006 describes a length-adjusting device of the initial cited kind which automatically changes the length of a brake linkage using two ratchet connections in the manner of a freewheel. The lengthening of the brake linkage upon brake-pad wear is implemented by actuating the brake, where required several times. However the first brake actuation may not achieve the desired braking. Furthermore operation of this device requires a fixed rest directly supporting this device.

SUMMARY OF THE INVENTION

The object of the invention is to provide an operationally reliable length-adjusting device of simple theoretical and practical design making possible first-time adjustment of the cable or remote control. Another object of the invention is a length-adjusting device for automatic cable-length compensation.

This problem is solved in that the mutually locking components are secured in their locking position by a movable securing element. Locking or snap-in connection herein denotes a geometrically locking connection by a spring-loaded latch, which can be disengaged from its locking position by applying a force, moving over a sloping surface. In the invention, the securing element is displaced out of the securing position when the proper setting of the length-adjusting device is desired, and thereupon the two force-transmitting components are pulled apart in the sense of an elongation of the compressed sheath and finally the securing element is again slipped-on into the desired locking position. This method can be repeated arbitrarily often as a readjustment in the presence of wear and it assures length adjustment already upon first-time actuation for instance of a handbrake.

An advantageous embodiment mode of the invention provides that in the locking position of the components, the securing element will be caught and/or locked. This feature ensures that unwanted slippage of the securing element and hence unwanted release of the locking components is precluded. Said locking motion or locking can be implemented or replaced by a bayonet lock, by a position behind the dead point or merely by clamping.

In an alternative embodiment mode of the invention, the securing element is spring-loaded to keep it in its securing position. In the simplest way, spring-loading can be achieved by a helical spring. Similarly a snap lock with a flexible hook may engage matching recesses. The invention covers any fastening mode of the securing element in its intended securing position that works as a function of material flexibility.

In particular as regards a flexible, mechanical remote-control with a twisted-wire rope core and a spirally reinforced sheath, an embodiment mode of the invention provides that both components be hollow and that they nest into one another for locking. The foremost intent in this respect is to make the components cylindrical and circular in cross-section in order to achieve thereby simple manufacture. Reducing collars present at the ends of the components axially support the abutting sheath segments at the base of sheath fasteners or at a support. The length-adjusting device of the invention can be used in this manner for extensive protection against soiling and in compact size in lieu of an equally long sheath segment. Moreover retrofitting with the length-adjusting device of the invention will be feasible as a rule. Special fastening of the length-adjusting device is not required, though if desired it may also be present in the form of tabs or eyes in the device. This particular embodiment mode of the invention preferably shall be made of plastic. In a further development of the concept of the invention, both components evince saw-tooth shaped longitudinal segments present at mutually facing sides of these components. The longitudinal saw-tooth segments are present at the periphery. They evince a plurality of teeth to allow as fine control as possible when adjusting to the required length.

In a further feature of the invention, automatically matching the desired length is achieved in that the two components are fitted with a spring spreading them apart when in the properly determined position of operation, the spring force exceeding the locking impedance of the components. The spring moreover is designed in such a way that it simultaneously provides the desired prestressing in this application. Accordingly the mechanic need not determine the force by which a connection of preferably movable parts shall be prestressed, said force instead being reliably foreseeable within narrow limits.

In particularly advantageous manner, the invention provides several arms at one of the components to be locked, the ends of said arms comprising locking elements with securing elements on which they rest. The arms extend longitudinally. The locking elements mounted at one component are arrayed in the same transverse plane around the component to be locked. For components in the form of cylindrical shells, it is then possible to repeatedly axially slit a longitudinal end of the said cylinder and to shape the ends of the longitudinal strips acting as arms into locking elements.

In a further development of the invention, the locking elements comprise a sloping surface on their back side to match a complementary sloping surface at the securing element which is spring-loaded into the securing position. Preferably this further development of the invention comprises two springs, the first of which forces apart the locked components for the purpose of extending the length-adjusting device and moves the securing element on the locked components into rest, whereas the second spring provides overload protection, ie precludes undesired resetting. To achieve this cooperation of the elements of the length-adjusting device, the spring forcing apart the components is more compliant than that used for overload protection. The length-adjusting device so designed constantly ensures a pre-selectable degree of prestressing, for instance for a flexible, mechanical remote-control. If for instance the materials used were to entail elongation of the wire rope or compression of the sheath, such prestressing would be eliminated and the spring forcing the components apart will then move the components to be locked into the locking position until the slack in the remote control has been eliminated.

The sloping surface on the back side of the locking elements is longer than the teeth locking the pressure-loaded components. When being forced apart, the locking elements slip by their locking beaks into the next locking position while the two sloping surfaces remain in contact. The length-adjusting device so extended assures both automatic adjustment of the remote-control and its constant prestressing without the need for external intervention.

To prevent unwanted slippage of the locking elements from the position between the complementary sloping surface at the securing element and the sloping surface of the toothing, a preferred embodiment mode of the invention provides an undercut formed by the sloping surface and the tooth angle at the locking elements.

In further development of its basic concept, the invention also offers a way of avoiding overloading for instance a remote-control by providing a reserve spring excursion between the components. The reserve spring excursion may be used as clutch play when the length-adjusting device is used in a clutch cable of a motor vehicle, or it may serve as overload prevention, depending on the design of the spring prestressing the mutually displaceable components. Such overload prevention is especially advantageous for cable window-lifts or handbrake cables.

In one embodiment mode of the invention, at least three force-transmitting components are provided, locking taking place between two components and the reserve of spring excursion relative to the third component being built up by a spring. The third component is guided at one of the mutually locked components between two stops and is pressed by said spring against one of the stops. Again this spring is designed for elongating the length-adjusting device.

Lastly the device of the invention may be simplified in that the spring building up the reserve of spring excursion forces one of the components into its securing position.

BRIEF DESCRIPTION OF THE INVENTION

The invention is elucidated below in relation to the drawings.

FIG. 1 is a sideview and partial section of a length-adjusting device of the invention with a schematically shown clutch with clutch pedal, FIG. 2 is an alternative embodiment mode of the invention shown in the manner of FIG. 1, FIG. 3 is a further embodiment mode of the invention shown in longitudinal section, FIG. 4 is yet another embodiment mode of the invention shown in longitudinal section and FIG. 5 is an enlarged cutaway of FIG. 4.

DESCRIPTION OF THE PREFERRED EMBODIMENTS

Figure 1:
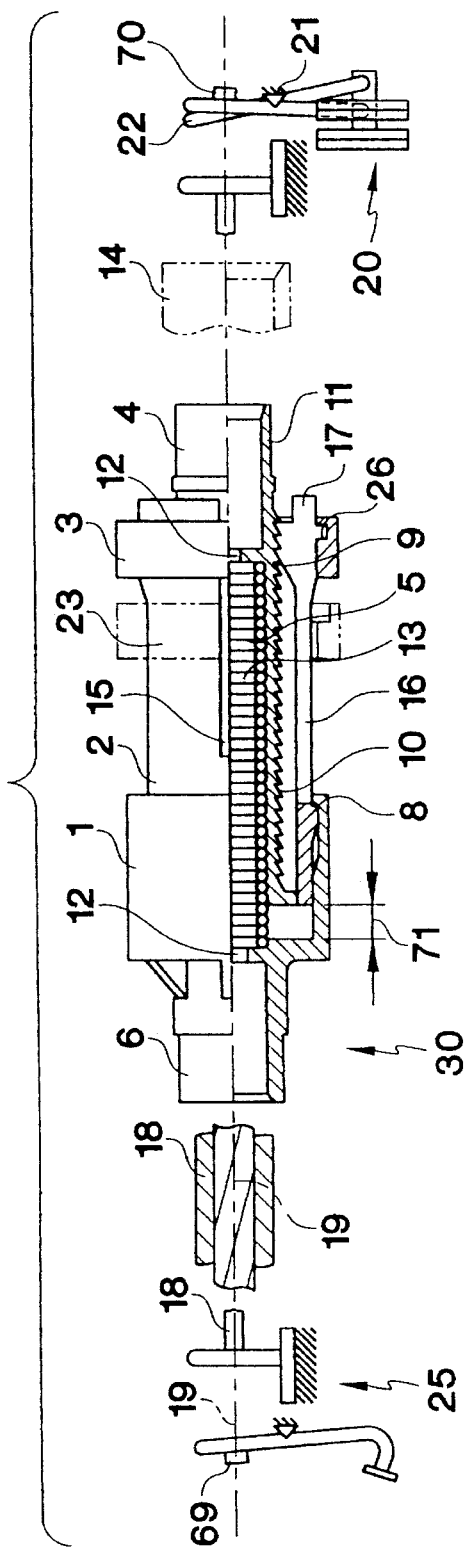

FIG. 1 Shows a length-adjusting device 30 mounted to a clutch cable of a motor vehicle between a clutch pedal 25 and a clutch 20. A flexible mechanical remote-control with a sheath 18 and therein a to-and-fro displaceable wire rope 19 can be inserted from both sides into sheath fasteners 6 and 11 in the length-adjusting device 30. A continuous borehole 12 allows unhampered passage of the wire rope 19. A bush component 4 in the shape of an index bolt is locked to a component 2 in the shape of a collet. For locking, the bush component 4 is fitted with an outer toothing 10 meshing with an inner toothing 9 at locking elements 17 formed at the free ends of arms 16 of the component 2. The arms 16 bend elastically and upon axial loading of the device 30, they are able to elastically move outward without being supported by an annular securing element 3 and thus allow axial displacement of the component 4.

The component 2 designed as a collet evinces the shape of a bush and is subdivided by several longitudinal slits 15 along a longitudinal segment into several arms 16. This component 2 is locked by a sealing cap 1 by means of a snap-connection 8. The sealing cap 1 moves with play 71 on the component 2 and thereby a slight axial displacement of a few mm is possible between the sealing cap 1 and the component 2. The securing element 3 externally displaceable on the length-adjusting device 30 can be manually moved to-and-fro between the position shown in solid lines and the position 23 shown in dashed lines. To lock the entire device, said securing element 3 is moved against a stop 26 in the shape of an annular collar and there it is clamped in place.

The components 2 and 4 and the sealing cap 1 are forced apart in essentially play-free manner by a compressively prestressed central spring 5.

FIG. 1 shows clutch actuation in solid lines when the clutch pedal 25 is idle in the pre-assembled state. In this case the clutch disengaging lever 21 of the clutch 20 is in its rearmost position. In this position of the clutch disengaging lever 21 the clutch will be engaged.

The length-adjusting device 30 is integrated in the arrangement shown to mount the clutch drive cable. The sheath 18 with the length-adjusting device 30 is at its shortest length. In the shown arrangement, the ends 69, 70 of the wire rope 19 are easily hooked up manually at the clutch pedal 25 and at the clutch disengaging lever 21. When the wire rope 19 is hooked up, the securing element 3 is moved into its position 23. In this position of the securing element 3, the compression spring 5 is able to spread apart the arms 16, and the component 4 loaded by the spring 5 moves into its position 14 wherein all slack has been forced out of the drive cable for the clutch 20. The prestressing of the entire clutch cable taking place automatically by the single spring 5, the securing element 3 is moved again manually into its locking position shown in full lines. The drive cable for clutch 20 then will be fully installed.

The central spring 5 also allows slightly compressing the length-adjusting device 30 by the magnitude denoted 71. The spring 5 may be designed in such manner that the reserve spring excursion 71 serves as clutch play or as overload safety.

Figure 2:
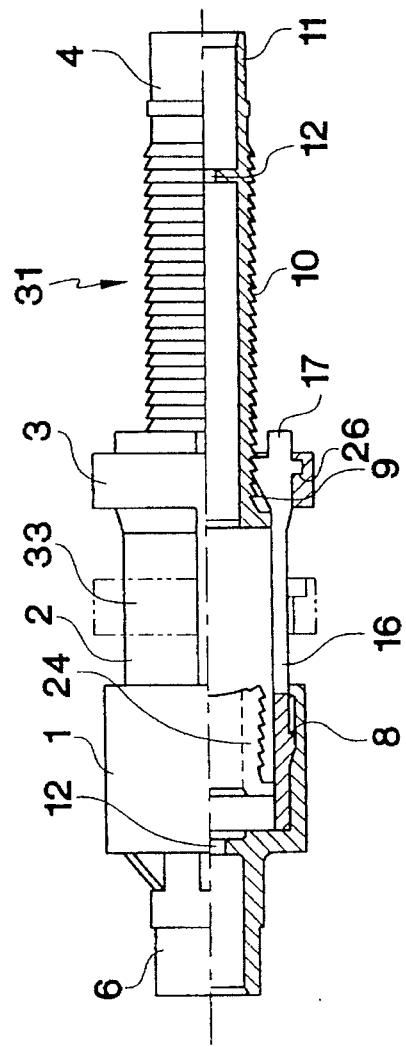

The parts of the length-adjusting device 31 shown in FIG. 2 are substantially the same design as in FIG. 1, only the assembly procedure being different and furthermore the device 31 lacks a spreading spring. Lastly the embodiment mode of FIG. 2 is without a reserve spring excursion. The components 2 and 4 and also the securing element 3 and the sheath fasteners 6 and 11 are the same design as in FIG. 1. Nor do the differences between the embodiment modes of FIGS. 1 and 2 affect the central continuous borehole 12 passing the wire rope 19 through the device 31.

In an assembly such as shown in FIG. 1 between a motor-vehicle clutch pedal 25 and a clutch 20, the length-adjusting device 31 with its component 4 shown in solid lines will be inserted pre-assembled into the clutch system. In order to hook up the wire-rope ends 69, 70, the clutch disengaging lever 21 must be previously moved into the dashed position denoted 22. Thereupon, even if the component 4 were pulled out, the ends 69, 70 are easily hooked up. The position 22 renders the position of the disengaging lever 21 wherein said lever must be in the predetermined disengaging position of the clutch 20. The clutch pedal 25 is actuated to adjust the clutch. In the process, with the securing element moved into the position 33, the component 4 of FIG. 2 shifts into the bush component 2 until position 24 is reached. Presently the position of the clutch pedal 25 and that of the disengaging lever 21 represent a disengaged clutch. The securing element 3 is moved onto the seat of the toothings 9 and 10 in the zone of the locking elements 17 and the clutch pedal 25 then is released. With a suitably designed clutch system, this clutch will then engage when the pedal 25 is released.

The embodiment mode of the length-adjusting device 32 shown in FIG. 3 comprises similarly to FIGS. 1 and 2 two nesting components 27, 61 mutually locking by toothings 39, 40. The longitudinal ends of the remote-control cables can be inserted into sheath fasteners 38 and 73 and be fixed in place by clamping rings 36, 37. The component 27 is fitted with a continuous borehole 42 extending into a sealing cap 28 at the longitudinal end of the component 61. Similarly to component 2, the component 61 is designed like a collet with a longitudinal end fitted with slits 46. Elastic arms 44, 45 comprising at their ends the locking elements 43 are separated by the longitudinal slits 46. The locking elements 43 are all mounted in the same transverse plane of the length-adjusting device 32. At their insides they comprise the toothing 39 which is complementary to the toothing 40 on the outside of the component 27.

A securing element 29 is mounted externally and displaceably on the component 61 and is forced by a spring 34 into its locking position above the locking element 43. The spring 34 rests on an annular collar 47 outside the sealing cap 28 and on a shoulder 48 of the securing element 29. The sealing cap 28 is connected by a snap connector 72 to the component 61, said snap connector 72 allowing displaceability of a few mm between the cap 28 and the component 61 to act as a spring-excursion reserve 59. This reserve may be used both for overload safety or clutch play as already shown in FIG. 1. The entire length-adjusting device is axially prestressed by a compression spring 63 inside the component 27 as already described in relation to FIG. 1. In the process the sealing cap 28 and the component 61 are forced apart so much by the central spring 63 that the spring-excursion reserve 59 is achieved.

Essentially the difference relative to FIG. 1 is that the components 27, 61 are locked automatically by the spring-loaded securing element 29 and that no additional steps are required to secure the securing element 29 into its locked position.

The embodiment mode of a length-adjusting device 50 shown in FIG. 4 with a cutaway enlargement shown in FIG. 5 is characterized in that it implements automatically the length adjustment of said device as soon as the required degree of prestressing for instance of the sheath of a flexible, mechanical remote control no longer is present. The length-adjusting device 50 comprises a bush component 49 fitted with an outer toothing 75 and further a sheath fastener 51 and a central continuous borehole 74. A component 54 is moved over and guided on the component 49 and locks into it. Both components 49, 54 are braced with respect to each other by a compressed spring 53. Axial, elastic arms 55 with locking elements 56 are present at the end face of the component 54 and by an inner toothing 76 engage the outer toothing 75 of the component 49. At its end face the securing element 57 comprises a sloping surface 62 associated with a complementary sloping surface at the locking element 56. By its front tip the locking element 56 forms an undercut 68 engaging the toothing 75. This undercut 68 is formed by the different slope α of the sloping surface 62 and the sloping surface 67 of the inner toothing at angle β. As a result unwanted disengagement of the locking element 56 from the gap between the toothing 75 and the securing element 57 is prevented.

The securing element 57 assures locking the components 49 and 54. The securing element 57 assumes the shape of a bush and is axially guided at the component 49. The component 64 is in the form of a sheath fastener and is forced by the spring 58 against the hooks 65 of the securing element 57, said hooks servings as rests and entering slits 66 of the component 64. A sheath fastener 77 is present at the component 64 at the outermost longitudinal end of the device 50. A spring-excursion reserve 60 is bounded by the hooks 65 serving as stops at the securing element 57 and by the end face of the said securing element 57.

The entire device 50 is compressed by the parts to be connected, namely the clutch pedal and the clutch in FIG. 1 or the wire-rope ends of a cable window lifter.

In both cases of first setting and subsequent adjustment, a compression spring 58 mounted between the components 49 and 54 moves these components apart until the entire device 50 comes against stops at both ends. Without these external impedances the securing element 57 can not lock the components 49 and 54 and the component 49 will slip underneath the retracting locking elements 56 of FIGS. 4 and 5 to the right. As soon as component 64 encounters impedance, it will force the securing element 57 onto the back side of the locking elements 56 which thereby are locked to the component 49.

On one side the spring 58 rests on the slider 64 and on the other against the securing element 57, both components thereby being tightened with respect to each other. This prestressing also implements a spring-excursion reserve 60 which may assume various functions as was already the case for the spring-excursion reserves 59 and 71. The force function characteristic of the spring-excursion reserve can be designed independently of the spring characteristics of the spring 53 provided merely that spring 58 be stiffer than spring 53.

We claim:

1. A device for adjusting the length of cables comprising first and second relatively adjustable components which can be locked at different relative positions, wherein said first component is designed as a bush component in a configuration of an index bolt, said index bolt being provided with an outer toothing, and said second component having a configuration of a collet, said collet being integrally provided with elastically bendable arms having an inner toothing, said inner toothing meshing with said outer toothing in a plurality of locking positions, and wherein a displaceable securing element is provided, said securing element being configured as a securing sleeve, said sleeve being slideably mounted on said collet and manually movable along said collet to-and-fro between a securing position and an unlocking position of said arms of said collet, said securing element locking said first and second components in one of said locking positions when in said securing position.

2. The device defined in claim 1, characterized by a reserve of spring excursion between the components.

3. The device defined in claim 1, wherein a spring resiliently forces said components apart in an operational mode, the force exerted by said spring being larger than a locking impedance of the components when said securing element is in said unlocking position.

4. The device defined in claim 1, characterized in that the components are hollow and nest into each other for locking.

5. The device defined in claim 1, characterized in that said outer toothing of said index bolt and said inner toothing of said collet mesh each other along a plurality of longitudinal segments.

6. The device defined in claim 1, characterized in that one of said components comprises a plurality of locking elements formed at an end of each of said bendable arms, said locking elements abutting a back side of the securing element.

7. The device defined in claim 6, characterized in that the locking elements comprise a sloping surface associated with a complementary sloping surface on the securing element and in that the securing element is forced by a locking spring into the securing position.

8. The device defined in claim 7, characterized in that an undercut defined by the securing element sloping surface and a toothing angle is formed between the locking elements and the second component.

9. A device for adjusting the length of cables comprising first and second relatively adjustable components which can be locked at different relative positions, wherein said first component is designed as a bush component in a configuration of an index bolt, said index bolt being provided with an outer toothing, and said second component having a configuration of a collet, said collet being integrally provided with elastically bendable arms having an inner toothing, said inner toothing meshing with said outer toothing in a plurality of locking positions, wherein a displaceable securing element is provided, said securing element being configured as a securing sleeve, said sleeve being slideably mounted on said collet and manually movable along said collet to-and-fro between a securing position and an unlocking position of said arms of said collet, said securing element locking said first and second components in one of said locking positions when in said securing position; and wherein the securing element is locked into one of the locking positions of the first and second components to retain said first and second components in one of said locking positions and the securing element is retained in said securing position by spring loading.

10. A device for adjusting the length of cables comprising first and second relatively adjustable components which can be locked at different relative positions, wherein said first component is designed as a bush component in a configuration of an index bolt, said index bolt being provided with an outer toothing, and said second component having a configuration of a collet, said collet being integrally provided with elastically bendable arms having an inner toothing, said inner toothing meshing with said outer toothing in a plurality of locking positions, and wherein a displaceable securing element is provided, said securing element being configured as a securing sleeve, said sleeve being slideably mounted on said collet and manually movable along said collet to-and-fro between a securing position and an unlocking position of said arms of said collet, said securing element locking said first and second components in one of said locking positions when in said securing position; and said device further comprising a third component defining a spring-excursion reserve delineating a degree of movement of said first and second components, said spring-excursion reserve being built up relative to the third component by a spring, wherein the spring building up the spring-excursion reserve forces the securing element into said securing position.

* * * * *